United States Patent
Kwak (12) United States Patent (10) Patent No.: US 7,256,387 B2
Kwak (45) Date of Patent: Aug. 14, 2007

(54) OPTICAL POINTING SYSTEM AND METHOD FOR CONTROLLING A SAMPLING RATE AND A MAXIMUM SEARCH WINDOW THEREBY

(75) Inventor: Jong Taek Kwak, Seongnam (KR)

(73) Assignee: ATLab Inc. (KR)

( * ) Notice: Subject to any disclaimer, the term of this patent is extended or adjusted under 35 U.S.C. 154(b) by 281 days.

(21) Appl. No.: 10/717,959

(22) Filed: Nov. 20, 2003

(65) Prior Publication Data

US 2004/0099798 A1 May 27, 2004

(30) Foreign Application Priority Data

Nov. 21, 2002 (KR) ................ 10-2002-0072821
Nov. 11, 2003 (KR) ................ 10-2003-0079623

(51) Int. Cl.
*H01J 40/14* (2006.01)
*G09G 5/08* (2006.01)

(52) U.S. Cl. .................................. 250/221; 345/166

(58) Field of Classification Search ................ 345/163, 345/166; 250/221
See application file for complete search history.

(56) References Cited

U.S. PATENT DOCUMENTS 6,429,422 B1 * 8/2002 Bohn ......................... 250/234
6,455,840 B1 * 9/2002 Oliver et al. ............ 250/222.1

* cited by examiner

*Primary Examiner*—Thanh X. Luu
(74) *Attorney, Agent, or Firm*—Cantor Colburn LLP (57) ABSTRACT

The present invention relates to an optical pointing system and a method for calculating a movement value thereof, comprising: an image sensor for detecting light reflected from a worktable surface to generate an image signal, a maximum search window variable circuit for inputting at least one of the image signal and a movement value to change a size of a maximum search window, and a movement value calculation circuit for calculating the movement value of the image signal using the maximum search window with the changed size. Therefore, an exact movement value can be found by changing at least one of the maximum search window and a sampling rate according to at least one of a quantity of light and a movement speed to calculate the movement value.

12 Claims, 9 Drawing Sheets

ENTIRE WINDOW     MASK WINDOW

MAXIMUM SEARCH WINDOW(± 3)

ENTIRE WINDOW     MASK WINDOW

MAXIMUM SEARCH WINDOW(± 7)

ENTIRE WINDOW    MASK WINDOW

MAXIMUM SEARCH WINDOW(± 3)

FIG. 8B

ENTIRE WINDOW    MASK WINDOW

MAXIMUM SEARCH WINDOW(± 7)

FIG. 8C

OPTICAL POINTING SYSTEM AND METHOD FOR CONTROLLING A SAMPLING RATE AND A MAXIMUM SEARCH WINDOW THEREBY

CROSS-REFERENCE TO RELATED APPLICATION

This application claims the benefit of Korean Patent Application No. 2002-72821 and 2003-79623, filed on Nov. 21, 2002 and Nov. 11, 2003, respectively, the disclosure of which is hereby incorporated herein by reference in its entirety.

BACKGROUND OF THE INVENTION

1. Field of the Invention

The present invention relates to an optical pointing system and, more specifically, to an optical pointing system capable of adaptively changing a maximum search window and/or a sampling rate according to a quantity of incident light and a movement speed and a method for calculating a movement value thereof.

2. Description of the Related Art

Figure 1:
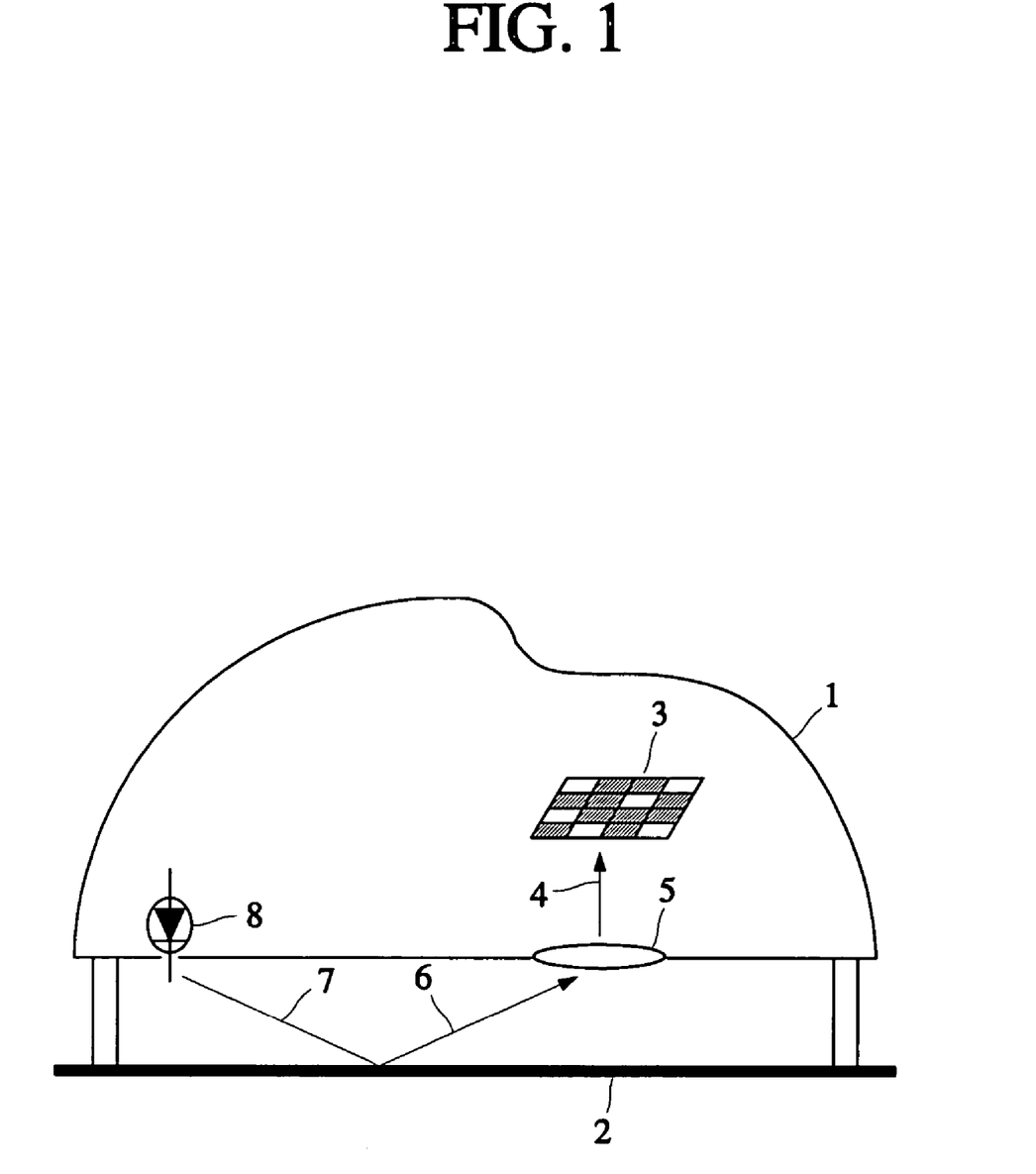
FIG. 1 is a diagram showing a general optical pointing system.

FIG. 1 shows a general optical pointing system comprising a light source 8, a lens 5, and an image sensor of a sensor circuit 3 (not shown).

In FIG. 1, Reference numeral 2 represents a worktable surface, and 4, 6 and 7 represent light.

In the optical pointing system shown in FIG. 1, the light 7 emitting from the light source 8 is reflected from the worktable surface 2, and the reflected light 6 passes through the lens 5. And then, the light 4 passing through the lens 5 is input to the image sensor 3 composed of a CMOS (Complementary Metal Oxide Semiconductor) device.

An image of the worktable is successively detected by means of the image sensor 3 and is stored in a memory (not shown) of the sensor circuit as image data. The sensor circuit calculates a correlation value between the image data currently inputted to the memory and the image data previously stored in the memory, calculates the movement value, and transmits it to a system such as a computer.

Figure 2:
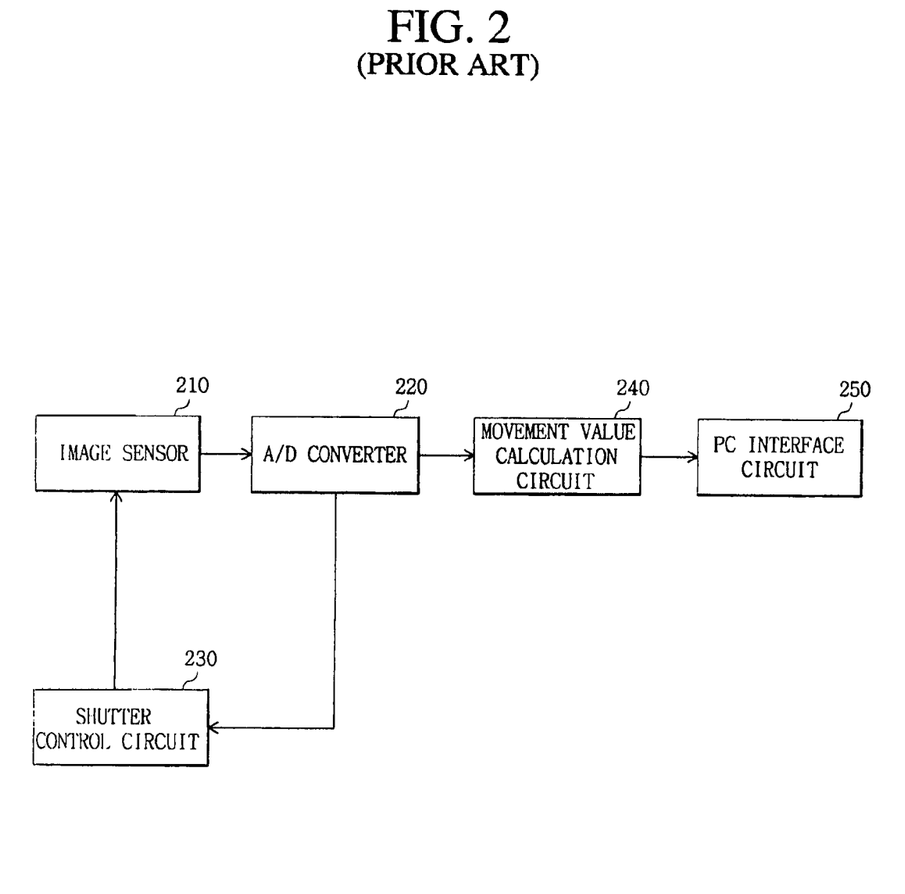
FIG. 2 is a block diagram of a sensor circuit of a conventional optical pointing system.

FIG. 2 shows a block diagram of a sensor circuit of a conventional optical pointing system, comprising an image sensor 210, an A/D converter 220, a shutter control circuit 230, a movement value calculation circuit 240, and a PC interface circuit 250.

A function of each block shown in FIG. 2 is described as follows.

The image sensor 210 receives light reflected from a worktable surface through the lens under the control of a shutter control signal SHCO to detect image data. The A/D converter 220 receives an analog signal outputted from the image sensor 210 to convert the analog signal to a digital signal. The shutter control circuit 230 generates the shutter control signal SHCO for controlling an electronic shutter (not shown) in the image sensor 210 such that an output of the AND converter 220 has a uniform distribution using the image data, which is an output signal of the A/D converter 220. The electronic shutter not shown comprises a CMOS device in the sensor circuit. The movement value calculation circuit 240 calculates and outputs the movement value of the image data, which is the output signal of the A/D converter 220, at a fixed sampling rate using a fixed maximum search window and mask window. The PC interface circuit 250 transmits the movement value outputted from the movement value calculation circuit 240 to a computer (not shown) at a fixed report rate. In other words, the PC interface circuit 250 stores the movement value outputted from the movement value calculation circuit 240, and then transmits the movement value at the fixed report rate required in the computer (not shown).

The sensor circuit of the conventional optical pointing system as described above always calculated a correlation value between image frame data previously inputted to the memory and newly inputted image frame data at the fixed sampling rate to output the movement value. For example, all the circuits in the sensor circuit were operated at the sampling rate fixed with 1500 or 2000 times per second as a reference one. Further, the sensor circuit of the conventional optical pointing system found the movement value and transmitted the result to the computer at the fixed report rate.

Moreover, the conventional optical pointing system could change a quantity of incident light only within a shutter exposure time, which has a predetermined operation time of the electronic shutter adjusting the quantity of incident light inputted to the image sensor 210, and the movement value calculation circuit 240 also calculated the correlation value at the predetermined sampling rate using the fixed maximum search window.

Meanwhile, when the sampling rate, the shutter exposure time, and the maximum search window are predetermined, if the quantity of light is extremely reduced, the optical pointing system is operated such a state that the quantity of light is increased by extending the exposure time of the electronic shutter in order to suffice the quantity of incident light. However, although the maximum time of a shutter exposure period adapted to the predetermined sampling rate is reached, when the required quantity of light is not inputted, the image sensor cannot represent a workable surface pattern as it is. As such, when the quantity of light is insufficient, the optical pointing system cannot discriminate a value of the workable surface pattern, so that the movement value cannot be found.

SUMMARY OF THE INVENTION

It is, therefore, an object of the present invention to provide an optical pointing system capable of finding an exact movement value by changing a maximum search window according to a quantity of light and/or a movement speed.

It is another object of the present invention to provide an optical pointing system capable of finding an exact movement value changing a sampling rate according to a quantity of light and/or a movement speed.

It is further another object of the present invention to provide a method for calculating a movement value of an optical pointing system for achieving different objects from the above ones.

A first aspect of an optical pointing system of the present invention for achieving the different objects from the above ones is characterized in that a sensor circuit comprises an image sensor for detecting light reflected from a worktable surface to generate an image signal, a maximum search window variable circuit for inputting the image signal and/or a movement value to change a size of the maximum search window, and a movement value calculation circuit for calculating the movement value of the image signal using the maximum search window with the changed size.

A second aspect of an optical pointing system of the present invention for achieving the different objects from the above ones is characterized in that a sensor circuit comprises an image sensor for detecting light reflected from a worktable surface to generate an image signal, a sampling rate and maximum search window variable circuit for inputting the image signal and/or a movement value to generate a sampling rate control signal for changing the sampling rate, and to change the size of the maximum search window, and a movement value calculation circuit for responding to the sampling rate control signal and calculating the movement value of the image signal using the changed maximum search window.

A method for calculating a movement value of an optical pointing system of the present invention for achieving the different objects from the above ones comprises the steps of: detecting light reflected from a worktable surface to generate an image signal; changing a sampling rate and a maximum search window that inputs the image signal and/or a movement value to generate a sampling rate control signal for changing the sampling rate and to change a size of the maximum search window; and calculating the movement value that responds to the sampling rate control signal and calculates the movement value of the image signal using the changed maximum search window.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification.

Figure 3:
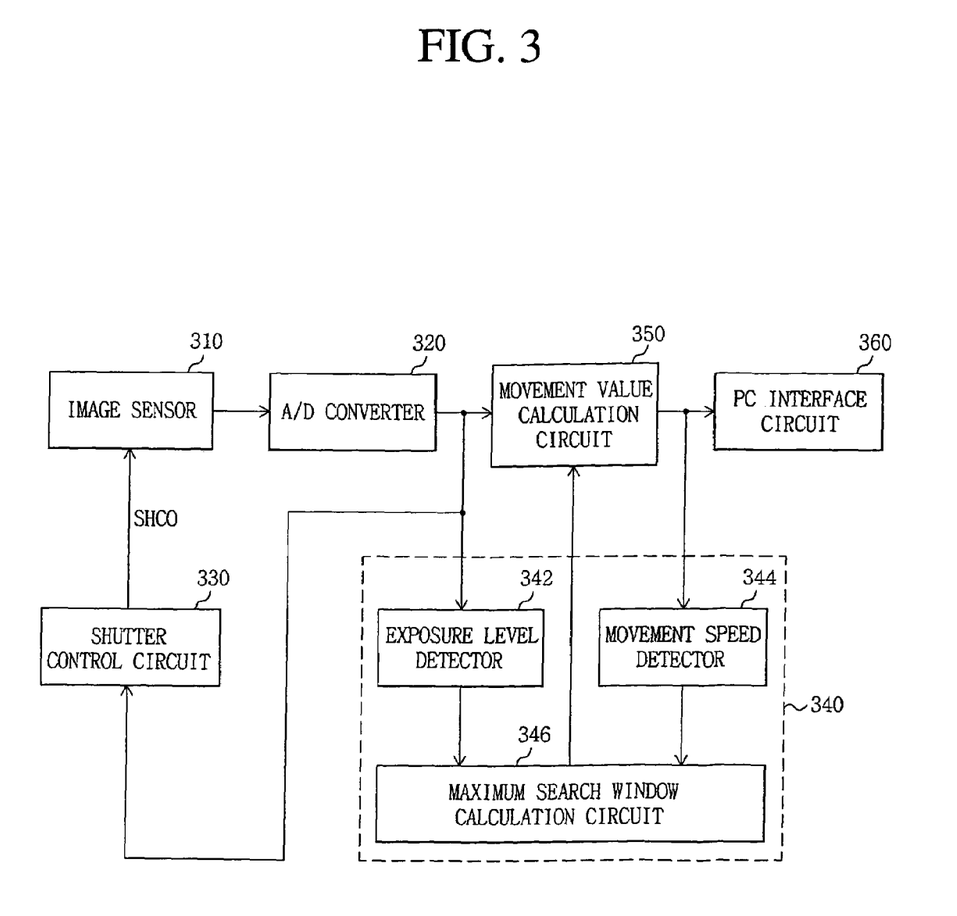
FIG. 3 is a block diagram of a sensor circuit of a first embodiment of an optical pointing system according to the present invention.

FIG. 3 is a block diagram illustrating a configuration of a sensor circuit of an optical pointing system according to the present invention, comprising an image sensor 310, an A/D converter 320, a shutter control circuit 330, a maximum search window variable circuit 340, a movement value calculation circuit 350, and a PC interface circuit 360. In FIG. 3, the maximum search is window variable circuit 340 comprises a light quantity detector 342, a movement speed detector 344, and a maximum search window calculation circuit 346.

A function of each block shown in FIG. 3 is described as follows.

The image sensor 310 receives light reflected from a worktable surface (not shown) under the control of a shutter control signal SHCO. The A/D converter 320 receives an analog signal from the image sensor 310 to convert it into a digital signal. The shutter control circuit 330 generates the shutter control signal SHCO for controlling an electronic shutter (not shown) in the image sensor 310 such that an output of the A/D converter 320 has a uniform distribution using image data, which is the output of the A/D converter 320. The maximum search window variable circuit 340 calculates a size of a maximum search window and/or mask window considering an output signal of the A/D converter 320 and a movement value. The light quantity detector 342 detects a quantity of light using the image data, which is the output of the A/D converter 320. The movement speed detector 344 detects a movement speed using the movement value outputted from the movement value calculation circuit 350. The maximum search window calculation circuit 346 calculates the size of the maximum search window and/or mask window considering the quantity of light and the movement speed outputted from the light quantity detector 342 and the movement speed detector 344. The movement value calculation circuit 350 calculates and outputs the movement value of a signal outputted from the A/D converter 320 at a fixed sampling rate using the maximum search window and/or mask window whose sizes are calculated by the maximum search window calculation circuit 340. The PC interface circuit 360 stores the movement value outputted from the movement value calculation circuit 350 and transmits the stored movement value to a computer (not shown) at a fixed report rate.

An operation of the maximum search window variable circuit 340 of the optical pointing system shown in FIG. 3 is described as follows.

The quantity of light and the movement speed are detected by means of the light quantity detector 342 and the movement speed detector 344, respectively. The maximum search window calculation circuit 346 sets the size of the maximum search window small if the quantity of light detected by the light quantity detector 342 is increased, sets the size of the maximum search window intermediate if the quantity of light is intermediate, and sets the size of the maximum search window large if the quantity of light is decreased. Further, the maximum search window calculation circuit 346 sets the size of the maximum search window small if the movement speed detected by the movement speed detector 344 is high, sets the size of the maximum search window intermediate if the movement speed is intermediate, and sets the size of the maximum search window large if the movement speed is low. At this time, the maximum search window calculation circuit 346 can variably set the size of the mask window as well as the size of the maximum search window according to the quantity of light and the movement speed.

The maximum search window variable circuit 340 of the optical pointing system of the present invention shown in FIG. 3 changes the size of the maximum search window and/or mask window according to the quantity of light and/or the movement speed, and the movement value calculation circuit 350 calculates the movement value of the image data outputted from the A/D converter 320 using the changed maximum search window.

Figure 4:
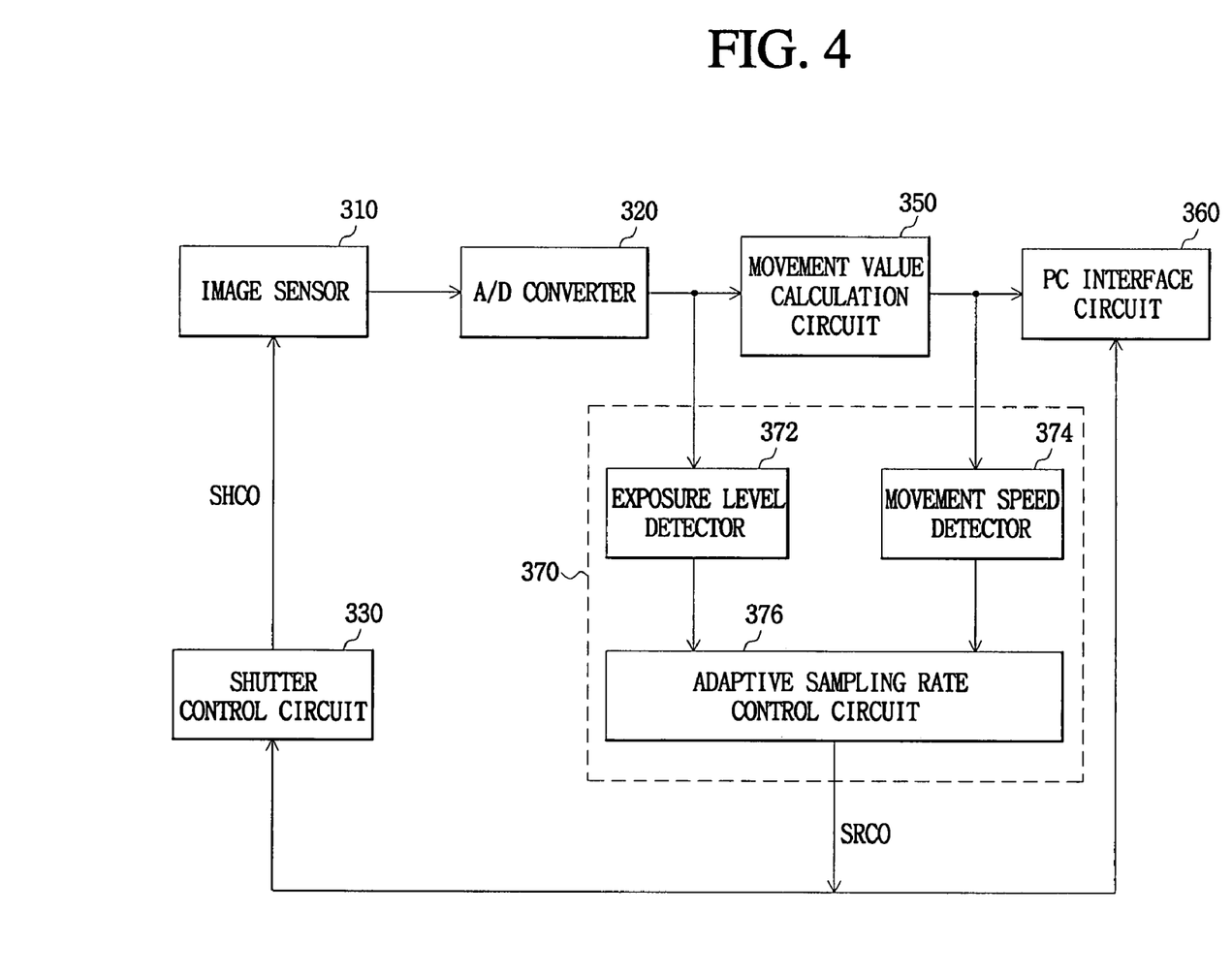
FIG. 4 is a block diagram of a sensor circuit of a second embodiment of an optical pointing system according to the present invention.

FIG. 4 is a block diagram illustrating a configuration of another embodiment of an optical pointing system of the present invention comprising: an image sensor 310, an A/D converter 320, a shutter control circuit 330, a movement value calculation circuit 350, a sampling rate variable circuit 370, and a PC interface circuit 360. The sampling rate variable circuit 370 comprises a light quantity detector 372, a movement speed detector 374, and a sampling rate control circuit 376.

FIG. 4 is configured such that an output signal of the sampling rate control circuit 376 is applied to the shutter control circuit 330. However, it may be configured such that an output signal of the A/D converter 320 rather than the output signal of the sampling rate control circuit 376 is applied to the shutter control circuit 330.

A function of each block shown in FIG. 4 is described as follows.

The image sensor 310, the A/D converter 320, the light quantity detector 372, and the movement speed detector 374 perform the same function as each block shown in FIG. 3, which is explained above. So, refer to the above description of FIG. 3.

The shutter control circuit 330 may generate the shutter control signal SHCO in response either to a sampling rate control signal SRCO outputted from the sampling rate control circuit 376, or to the signal outputted form the A/D converter 320. Further, an exposure time of an electronic shutter (not shown) in the image sensor 310 is controlled by the shutter control signal SHCO generated at this time. The sampling rate control circuit 376 generates the sampling rate control signal SRCO using the quantity of light outputted from the light quantity detector 372 and the movement speed outputted from the movement speed detector 374 to calculate the sampling rate. The movement value calculation circuit 350 calculates the movement value of image data outputted from the A/D converter 320 in response to the sampling rate control signal SRCO. The PC interface circuit 360 stores the movement value outputted from the movement value calculation circuit 350 in response to the sampling rate control signal SRCO and transmits the movement value to a computer (not shown) at the predetermined report rate.

An operation of the sampling rate variable circuit 370 of the optical pointing system shown in FIG. 4 is described as follows.

The quantity of light and the movement speed are detected by means of the light quantity detector 372 and the movement speed detector 374, respectively. The sampling rate control circuit 376 adjusts the sampling rate high if the quantity of light is increased, adjusts the sampling rate intermediate if the quantity of light is intermediate, and adjusts the sampling rate low if the quantity of light is decreased. Further, the sampling rate control circuit 376 adjusts the sampling rate high if the movement speed is high, adjusts the sampling rate intermediate if the movement speed is intermediate, and adjusts the sampling rate low if the movement speed is low. Therefore, the sampling rate control circuit 376 adjusts the sampling rate according to the quantity of light and the movement speed.

An operation of the shutter control circuit 330 according to the sampling rate control signal SRCO is described as follows.

The shutter control circuit 330 adjusts the exposure time of the electronic shutter (not shown) in the image sensor 310 short if the sampling rate control signal SRCO represents that the sampling rate is high, adjusts the exposure time of the electronic shutter (not shown) intermediate if the SRCO represents that the sampling rate is intermediate, and adjusts the exposure time of the electronic shutter (not shown) long if the SRCO represents the sampling rate is low.

Further, the shutter control circuit 330 may generate a control signal SHCO for controlling the exposure time of the electronic shutter (not shown) of the image sensor in response to the output signal of the A/D converter 320, and in this case, the operation of the shutter control circuit 330 is identical to the conventional shutter control circuit 210 shown in FIG. 2.

The sensor circuit of the optical pointing system shown in FIG. 4 is possible to variably change the sampling rate according to the quantity of light and/or the movement speed, and is possible to variably change the exposure time of the electronic shutter (not shown) according to the sampling rate.

Figure 5:
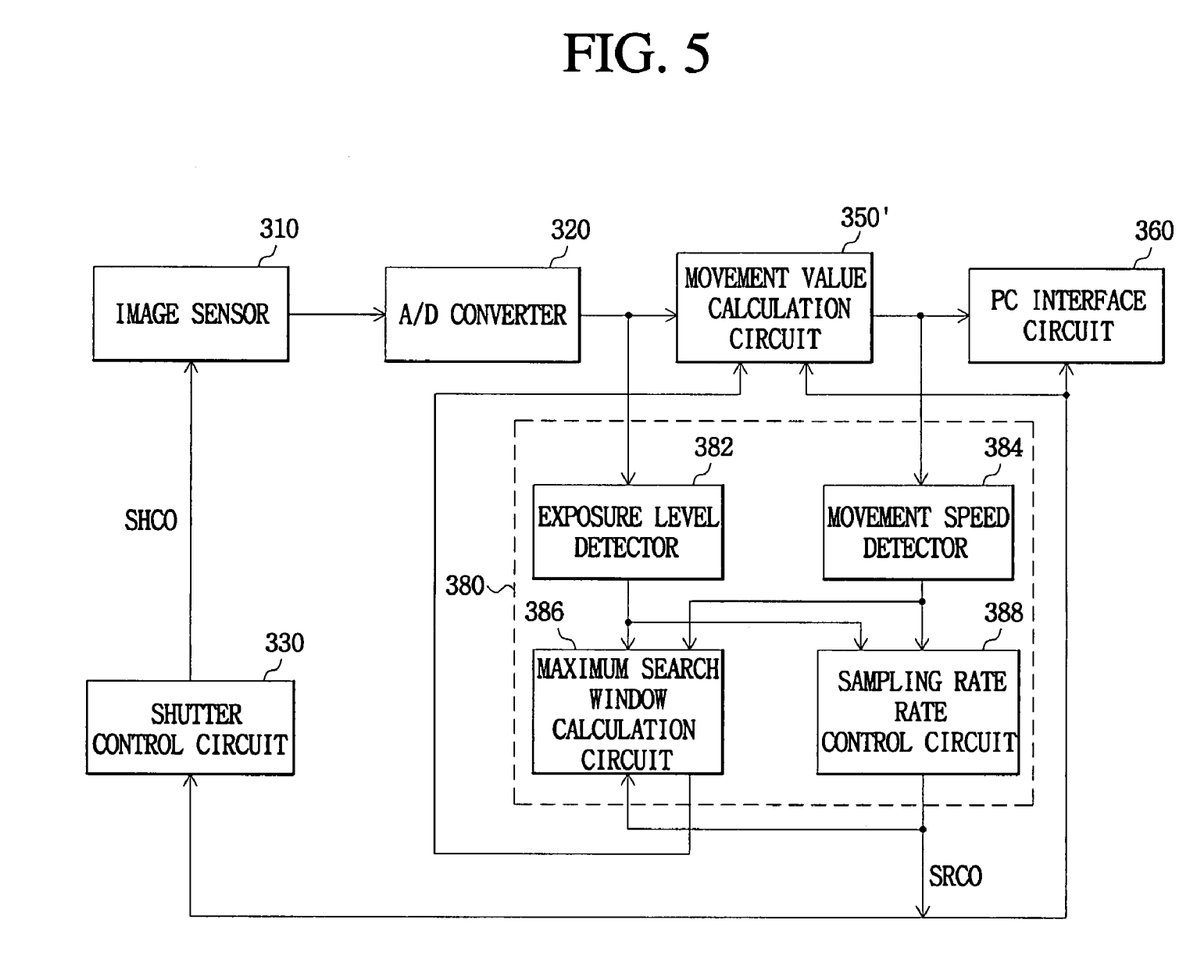
FIG. 5 is a block diagram of a sensor circuit of a third embodiment of an optical pointing system according to the present invention.

FIG. 5 is a block diagram illustrating a configuration of yet another embodiment of an optical pointing system of the present invention, which is configured by substituting the sampling rate variable circuit 370 shown in FIG. 4 with the maximum search window and sampling rate variable circuit 380, and the movement value calculation circuit 350 with the movement value calculation circuit 350'.

In FIG. 5, the maximum search window and sampling rate variable circuit 380 comprises a light quantity detector 382, a movement speed detector 384, a maximum search window calculation circuit 386, and a sampling rate control circuit 388. And in FIG. 5, while the maximum search window calculation circuit 386 is configured such that the light quantity detector 382, the movement speed detector 384, and the sampling rate control signal SRCO are all inputted, the maximum search window calculation circuit 386 may be configured such that only signals outputted form the light quantity detector 382 and the movement speed detector 384 are inputted, or only the sampling rate control signal SRCO is inputted.

In other words, the sensor circuit of the optical pointing system shown in FIG. 5 is a configuration comprising all elements of the sensor circuit shown in FIGS. 3 and 4.

Among the blocks shown in FIG. 5, operations of blocks whose reference numerals are the same as the blocks shown in FIG. 4 are identical to the operations of the blocks shown in FIG. 4, and the functions of the light quantity detector 382 and the movement speed detector 384 are the same as those of the light quantity detector 372 and the movement speed detector 374 shown in FIG. 4, and the sampling rate control circuit 388 performs the same operation as the sampling rate control circuit 376 shown in FIG. 4.

Therefore, only the function of the maximum search window calculation circuit 386 is explained herein.

The maximum search window calculation circuit 386 calculates the size of the maximum search window and/or mask window considering the quantity of light and the movement speed outputted from the light quantity detector 382 and the movement speed detector 384, or calculates the size of the maximum search window and/or mask window in response to the sampling rate control signal SRCO outputted from the sampling rate control circuit 388.

Operations of the maximum search window calculation circuit 386 and the sampling rate control circuit 388 of the sensor circuit of the optical pointing system shown in FIG. 5 are described as follows. Refer to the above description for operation that the maximum search window calculation circuit 386 adjusts the size of the maximum search window according to the quantity of light and the movement speed outputted from the light quantity detector 382 and the movement speed detector 384, and here, only the operation that the maximum search window calculation circuit 386 adjusts the maximum search window in response to the sampling rate control signal SRCO will be explained. The maximum search window calculation circuit 386 reduces the size of the maximum search window small if the sampling rate control signal SRCO that represents the sampling rate is high, adjusts the size of the maximum search window intermediate if the SRCO that represents the sampling rate is intermediate, and adjusts the size of the maximum search window large if the SRCO that represents the sampling rate is low. Further, the maximum search window calculation circuit 386 is possible to variably change the size of the mask window in response to the sampling rate control signal SRCO, and the size of the mask window can be changed either in proportional to the size of the maximum search window or in inverse-proportional to the size of the maximum search window. Here, the aforementioned method for controlling the sampling rate and the size of the maximum search window is to make power consumption uniform. For example, when the sampling rate is increased, the power consumption is also increased, where the quantity of signals that the sensor circuit should process can be kept constant by reducing the size of the maximum search window, and when the sampling rate is decreased, the power consumption is also decreased, where the quantity of signals that the sensor circuit should process can be kept constant by increasing the size of the maximum search window. Further, the method for controlling the sampling rate and the size of the maximum search window can be changed according to objects, and only when the optical pointing system is accelerated, for example, fast acceleration can be momentarily obtained by adjusting the sampling rate and the size of the maximum search window with the method mentioned above.

It can be easily understood by referring to the above description as for the operation that the sampling rate control circuit 388 changes the sampling rate according to the quantity of light and the movement speed outputted from the light quantity detector 382 and the movement speed detector 384 to generate the sampling rate control signal SRCO.

The sensor circuit of the optical pointing system of the present invention shown in FIG. 5 is possible to variably adjust the maximum search window and the sampling rate according to the quantity of light and/or the movement speed, and further, it is possible to variably adjust the exposure time of the electronic shutter (not shown) according to the sampling rate.

That is, the sensor circuit of the optical pointing system of the present invention shown in FIG. 5 can calculate the movement value more precisely compared with the sensor circuit shown FIGS. 3 and 4.

Figure 6:
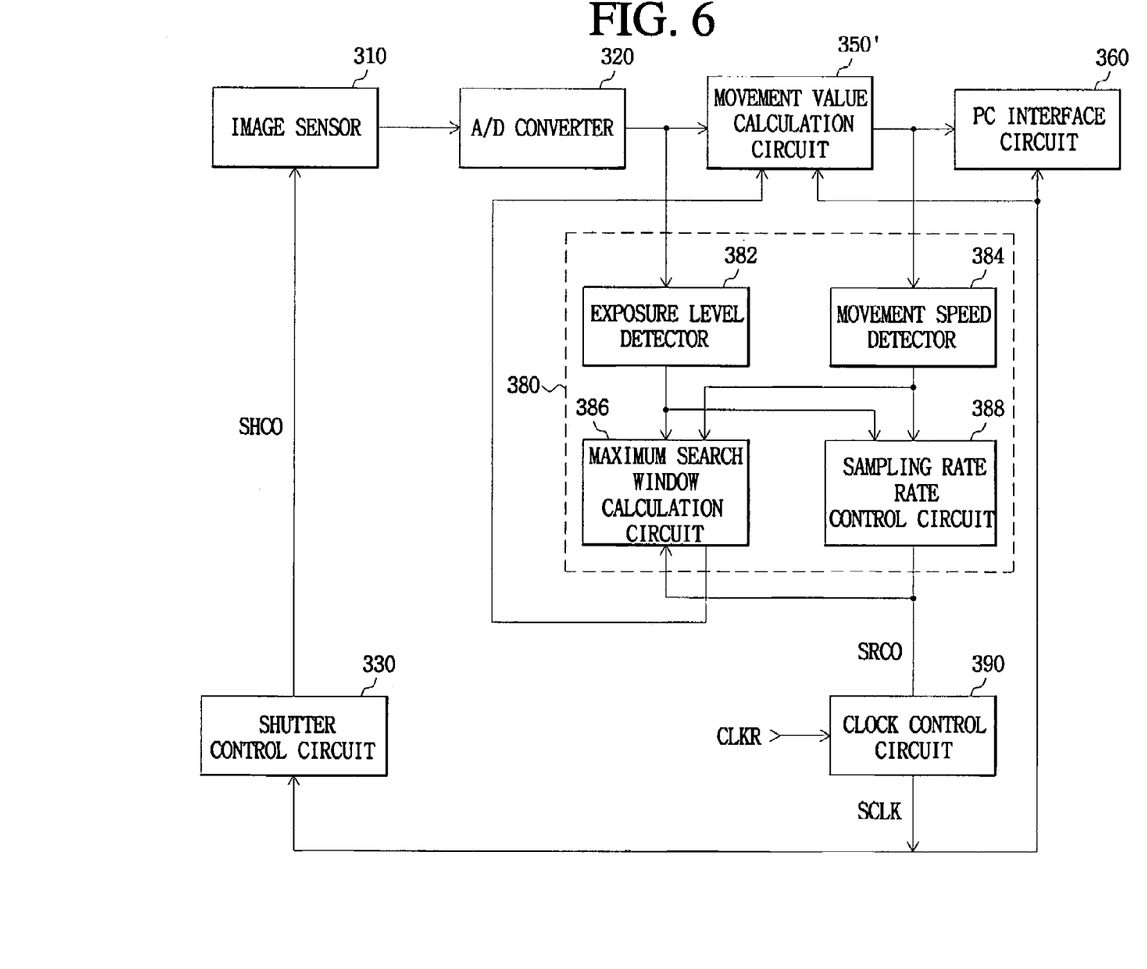
FIG. 6 is a block diagram of a sensor circuit of a fourth embodiment of an optical pointing system according to the present invention.

FIG. 6 is a block diagram illustrating yet another configuration of the sensor circuit of the optical pointing system of the present invention shown in FIG. 5, further comprising a clock control circuit 390 compared with the sensor circuit shown in FIG. 5.

A function of the clock control circuit 390 shown in FIG. 6 is described as follows.

The clock control circuit 390 inputs a reference clock signal CLKR to generate a predetermined number of divided clock signals, and in response to the sampling rate control signal SRCO, selects one clock signal among the predetermined number of divided clock signals to generate a sampling clock signal SCLK.

Therefore, the sampling clock signal SCLK generated by the clock control circuit 390 shown in FIG. 6 is applied to the shutter control circuit 330, the maximum search window calculation circuit 386, the movement value calculation circuit 350, and the PC interface circuit to perform an operation in response to the sampling clock signal SCLK.

Further, although not shown, the configurations in FIGS. 3 and 4 can also further comprise the clock control circuit 390.

Figure 7:
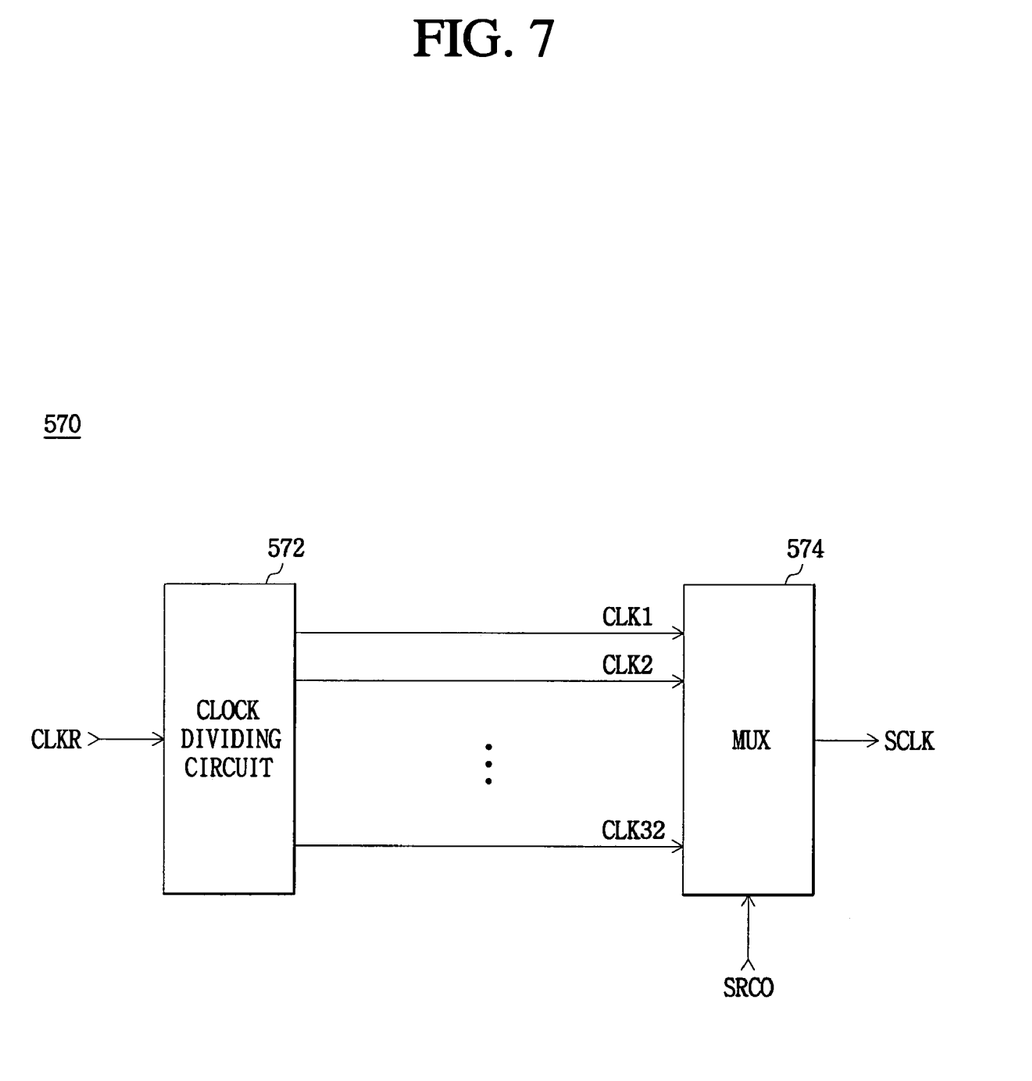
FIG. 7 is a block diagram of an embodiment of a clock control circuit of the optical pointing system shown in FIG. 6.

FIG. 7 is a block diagram illustrating a configuration of an embodiment of the clock control circuit shown in FIG. 6, comprising a clock dividing circuit 572 and a multiplexer 574.

A function of each block shown in FIG. 7 is described as follows.

The clock dividing circuit 572 divides the reference clock signal CLKR to generate 32 divided clock signals CLK1 to CLK32. The multiplexer 574 generates one clock signal among the 32 divided clock signals CLK1 to CLK32 as a sampling clock signal SCLK in response to the sampling rate control signal SRCO.

Further, the clock control circuit can be configured with a circuit such as a Phase Locked Loop that changes a frequency of the sampling clock signal SCLK in response to the sampling rate control signal SRCO.

Figure 8A:
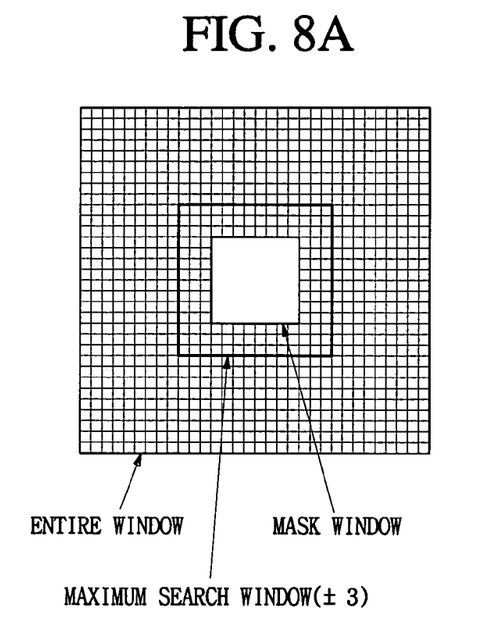
FIGS. 8A to 8C are diagrams for illustrating methods of adjusting a maximum search window of an optical pointing system of the present invention.
Figure 8B:
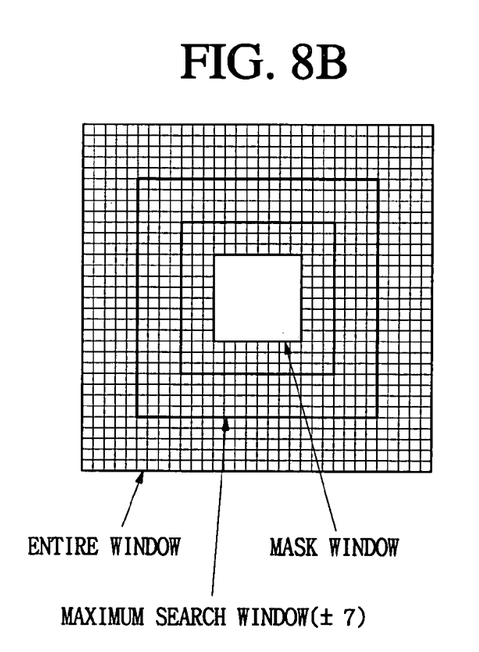
Figure 8C:
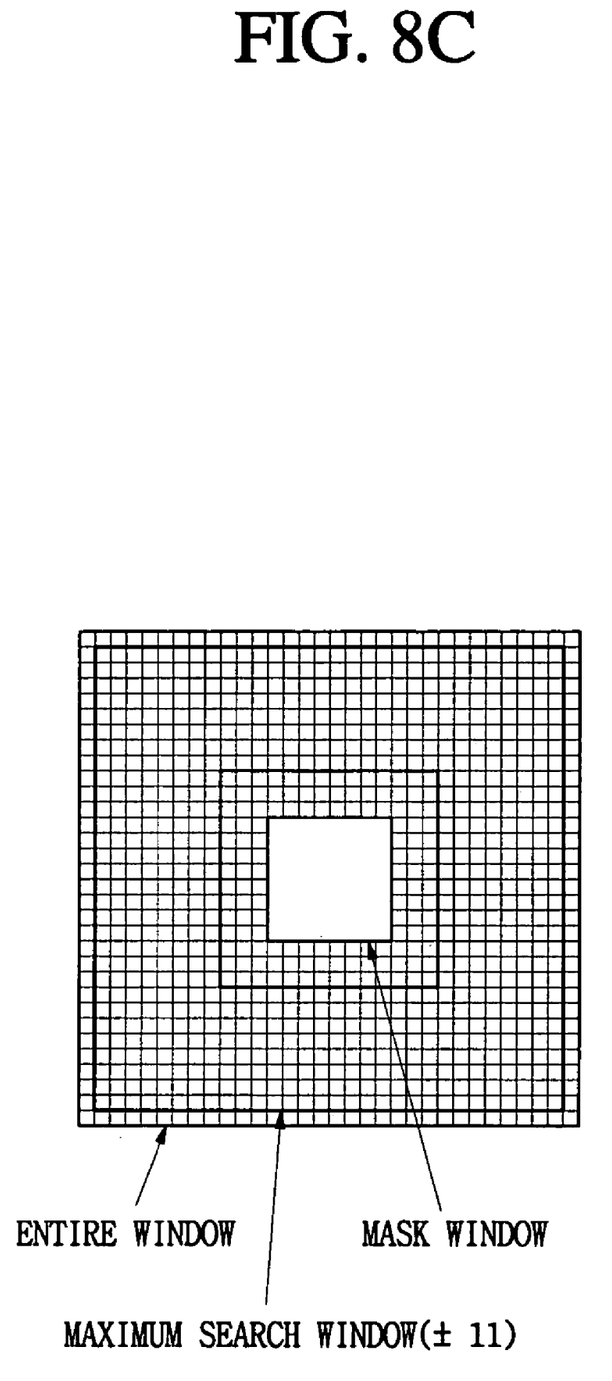

FIGS. 8A to 8C illustrate methods for adjusting a maximum search window of a sensor circuit of an optical pointing system of the present invention, and methods for adjusting the size of the maximum search window according to the sampling rate or the quantity of light and/or the movement speed in case that the size of entire window is 32×32, and the size of the mask window is fixed to 8×8.

In FIG. 8A, the size of the maximum search window is changed into 14×14 when the sampling rate is high or the quantity of light is increased and/or the movement speed is high, and accordingly, the mask window can be moved by 3 pixels up and down, right and left. In FIG. 8B, the size of the maximum search window is changed into 22×22 when the sampling rate is intermediate or the quantity of light is intermediate and/or the movement speed is intermediate, and accordingly, the mask window can be moved by 7 pixels up and down, right and left. In FIG. 8C, the size of the maximum search window is changed into 30×30 when the sampling rate is low or the quantity of light is decreased and/or the movement speed is low, and accordingly, the mask window can be moved by 11 pixels up and down, right and left.

Since the size of the maximum search window is a value that can represent the maximum movement per one sample, this value becomes a variable representing a maximum distance that the optical pointing system can be moved per second. For example, if the movement is found at 400 cpi (clock per inch), the sampling rate is 2000, and the maximum search window is 3, then the movement of the optical pointing system becomes (2000 sample/second*3 pixel/sample)/(400 pixel/inch)=15(inch/second), thus the mouse can be moved as far as 15 inches per second.

The optical pointing system of the present invention as described above is possible to calculate the exact movement value changing the maximum search window and/or the sampling rate according to the quantity of light and/or the movement speed.

Although the preferred embodiment of the present invention is described, an ordinary skilled in the art will appreciate that various modifications and changes can be made without departing from the spirit and scope of the appended claims.

As described above, according to the optical pointing system and the method for calculating the movement value of this system of the present invention, the maximum search window and/or the sampling rate can be changed according to the quantity of light and/or the movement speed. Therefore, the exact movement value can be found according to the quantity of light and/or the movement speed.

Further, according to the optical pointing system and the method for calculating the movement value of this system of the present invention, the power consumption is kept constant and the operating speed becomes high, by changing the maximum search window and/or the sampling rate.

The method for calculating the movement value of the present invention can be applicable to apparatuses such as an optical mouse, a cellular phone, and a PDA.

What is claimed is:

1. An optical pointing system comprising:
   an image sensor for detecting light reflected from a worktable surface to generate an image signal;
   a maximum search window calculation circuit for inputting at least one of the image signal to detect a quantity of light and a movement value to detect a movement speed, and adjusting a size of the maximum search window and a size of a mask window according to the quantity of light and the movement speed;
   a sampling rate variable circuit for inputting at least one of the image signal and the movement value to generate a sampling rate control signal for changing a sampling rate; and
   a sensor circuit having a movement value calculation circuit for calculating the movement value of the image signal using the changed maximum search window in size.

2. The optical pointing system of claim 1, wherein the sampling rate variable circuit comprises:
   a light quantity detector for inputting the image signal inputted from the image sensor to detect the quantity of light;
   a movement speed detector for inputting the movement value inputted from the movement value calculation circuit to detect a movement speed; and
   a sampling rate calculation circuit for calculating the sampling rate according to at least one of the detected quantity of light and movement value to generate the sampling rate control signal.

3. The optical pointing system of claim 1, wherein the sensor circuit further comprises an A/D converter circuit for converting an analog signal outputted from the image sensor into a digital signal and outputting the digital signal to the maximum search window calculation circuit and the movement value calculation circuit.

4. The optical pointing system of claim 2, wherein the sensor circuit further comprises an interface circuit for storing the movement value outputted from the movement value calculation circuit at the sampling rate changed in response to the sampling rate control signal and transmitting the movement value to a computer at a predetermined report rate.

5. The optical pointing system of claim 1, wherein the maximum search window calculation circuit calculates the maximum search window at the sampling rate changed in response to the sampling rate control signal.

6. The optical pointing system of claim 1, wherein the movement value calculation circuit calculates the movement value at the sampling rate changed in response to the sampling rate control signal.

7. The optical pointing system of claim 2, wherein the sensor circuit further comprises a clock control circuit, including:
   a dividing circuit for dividing a reference clock signal to generate a predetermined number of clock signals having different frequencies from each other; and
   a selection circuit for selecting one clock signal among the clock signals in response to the sampling rate control signal,
   wherein the sampling rate is changed in response to one clock signal outputted from the selection circuit.

8. The optical pointing system of claim 2, wherein the sensor circuit further comprises a phased locked loop for generating a clock signal for changing the sampling rate in response to the sampling rate control signal.

9. An optical pointing system comprising:
   an image sensor for detecting light reflected from a worktable surface to generate an image signal;
   a sampling rate and maximum search window variable circuit for inputting at least one of the image signal to detect a quantity of light and a movement value to detect a movement speed and to generate a sampling rate control signal for changing a sampling rate; and
   a sensor circuit having a movement value calculation circuit for responding to the sampling rate control signal and calculating the movement value of the image signal;
   wherein the sampling rate and maximum search window variable circuit comprises:
   a light quantity detector for inputting the image signal inputted from the image sensor to detect the quantity of light;
   a movement speed detector for inputting the movement value inputted from the movement value calculation circuit to detect the movement speed;
   a sampling rate variable circuit for generating the sampling rate control signal for changing the sampling rate in response to at least one of the detected quantity of light and movement speed; and
   a maximum search window calculation circuit for calculating and outputting the maximum search window in response either to at least one of the detected quantity of light and movement speed, or to the sampling rate control signal.

10. The optical pointing system of claim 9, wherein the sensor circuit further comprises an A/D converter circuit for converting an analog signal outputted from the image sensor into a digital signal and outputting the digital signal to the maximum search window variable circuit and the movement value calculation circuit.

11. The optical pointing system of claim 9, wherein the sensor circuit further comprises an interface circuit for storing the movement value outputted from the movement value calculation circuit at the sampling rate changed in response to the sampling rate control signal, and transmitting the movement value at a predetermined report rate.

12. A method for controlling a sampling rate and a maximum search window of an optical pointing system, the method comprising the steps of:

detecting light reflected from a worktable surface to generate an image signal;

detecting a quantity of light for inputting the image signal inputted from an image sensor;

detecting a movement speed for inputting a movement value;

generating a sampling rate control signal for changing the sampling rate in response to the detected quantity of light and the movement speed;

calculating the maximum search window and outputting a size of the maximum search window in response to any one of the detected quantity of light and the movement speed, and the sampling rate control signal;

calculating the movement value for responding to the sampling rate control signal and calculating the movement value of the image signal using the calculated size of the maximum search window; and calculating a mask window and outputting a size of the mask window in response to any one of the detected quantity of light and movement speed, and the sampling rate control signal.

* * * * *